Patented Nov. 18, 1930

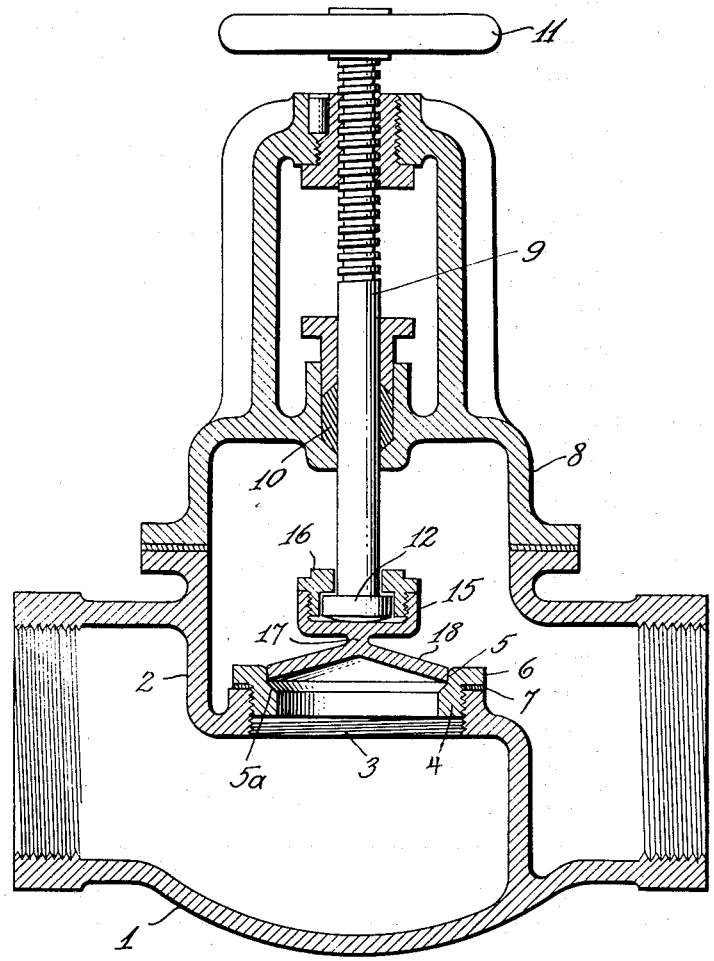

1,781,771

UNITED STATES PATENT OFFICE

WYLIE G. WILSON, OF JERSEY CITY, NEW JERSEY, ASSIGNOR TO WILSON RINGS COMPANY, OF JERSEY CITY, NEW JERSEY, A CORPORATION OF NEW JERSEY

VALVE

Application filed January 25, 1926, Serial No. 83,417. Renewed April 16, 1930.

This invention is a valve adapted for general application.

In the valve art, it is of fundamental importance that the seal effected by the valve be a tight seal and that the valve be capable of functioning a great number of times without becoming leaky, i. e., it should be repetitive in character, while retaining its capacity to produce a tight seal. While this desideratum has long been recognized, no construction has been heretofore produced which fully meets the requirements.

In valve construction, the seal is effected by two cooperable sealing elements, one of which is generally fixed and the other movable. The former may be termed, for the purposes of the invention, the seat, and the latter, the sealing member.

Pursuant to the practices of the prior art, valve seals have been formed by bringing a rigid sealing member into engagement with a rigid seat, or by forming one of these elements of material which is permanently deformed or distorted in producing the seal, or by interposing a gasket, composed of permanently deformable material, intermediate the sealing member and its seat. In the first instance, difficulties are encountered in accomplishing a tight seal because of irregularities in the two surfaces incident to their construction, to wear, to the presence of foreign matter between them, or to other causes. In the second and third instances, the deformable bodies very soon become so permanently distorted, as a result of wear, physical deterioration or other cause, that they can no longer produce a tight seal. In all the prior art structures, frequent inspection and repairs, at very considerable annoyance and expense, are necessary in order to maintain tight valves.

With these considerations in mind, the primary object of the present invention is to provide a valve capable of effecting a tight seal throughout long periods of repetitive use and under operating conditions, whereunder the valves of the prior art become ineffective after a relatively short period.

Another object of the invention is to so constitute the sealing elements and so operate them, that they may be constructed economically and without that refined workmanship which is usually incident to the grinding of valves and valve seats so that they will cooperate perfectly. The present structures are such that, even though in their primary manufacture they may not be axially coincident with relation to each other or of truly complementary shape, yet in the operation of the valve, they will adjust themselves to such irregularities and compensate for the same by reason of the material from which they are manufactured and the particular form employed in this connection.

Speaking generally, the valve of this invention embodies a sealing element (either the sealing member or its seat) in the form of a hollow cone or frustum of a hollow cone, and I have discovered that these forms will function with remarkable efficiency in the formation of a tight repetitive seal, when constituted from materials which, for the purpose of this invention, are termed "obdurate materials". By this term is meant materials which are bendable, but not easily bent, compressible, but not easily compressed, elastic, but not easily deformed. As examples of obdurate materials, I may mention, without excluding others, iron, steel, hard alloys (such as bronze), glass, ceramic materials, hard rubber, and wood. These materials are in pronounced contradistinction to those, which may be termed "non-obdurate", such as leather, asbestos, soft rubber, soft metals, etc.

As previously stated, the valve of this invention embodies a sealing element in the form of a hollow cone or frustum of a hollow cone, and it contemplates that such cone or frustum of a cone shall be formed of what is characterized as "obdurate material". It is also contemplated that said obdurate material shall be employed in such mass or thickness in relation to its length between supports or abutments as to present a resistance to axial compression which shall be sufficiently pronounced to present to any power that may be utilized to compress the same axially a resistance which shall be such as to make it impossible or impractical to compress the same beyond its elastic limit by the means employed to exercise axial compression on the said conical form.

The obdurate materials, when employed pursuant to this invention, are operated within their elastic limit, by which I mean that, when embodied in the form of a sealing element and placed under stresses which tend to deform said element, incident to producing a seal, the element shall retain a positive tendency to resume its original form when the stresses are relieved.

I have discovered that when an unbroken hollow conical sealing element of obdurate material is compressed axially, its outer periphery expands, substantially, in a circle; that is, the expansion is uniform all around when meeting with uniform resistance all around, and, accordingly, its periphery may be utilized to form a fluid tight seal with a cooperating sealing element.

Similarly, if a sealing element of hollow frusto-conical section is placed under axial compression, which tends to flatten it, the outer periphery of the frusto conical section, if free to expand, will expand cross axially and its inner periphery, if free to contract, will cross axially contract to bring either or both of said peripheries into engagement with suitable cooperating sealing elements for the purpose of producing a tight seal.

"Unbroken", as used above, may be defined as peripherally continuous; i. e., not slotted or formed into fingers.

By a "hollow cone", I mean a cone which is hollowed out to provide a conical shell.

By a "hollow frusto conical section", I mean a frusto conical section which is hollowed out to provide a frusto conical shell.

By "axial compression", I mean pressure exerted upon the sealing element in a direction coaxial with or parallel to its axis, whereby its altitude is diminished and the peripheral diameter of its base increased.

Attention is particularly directed to the fact that the stressing of the obdurate sealing element or elements must be within the elastic limit thereof; otherwise said element would not tend to resume (i. e., tend to spring back to) its normal unsealing form. Only an element in the sense of this invention composed of obdurate material and of substantially hollow conical or frusto conical configuration will thus properly function.

The term "elastic limit" as employed in the specification and claims of this application is so employed to designate that quality or characteristic of the conical forms of obdurate material employed which, when compressed within predetermined limits and then relieved of such compression, will cause said conical form to tend to return to approximately its original form and size. It is intended that such compression shall be within and not beyond the tendency of said conical section to return to its original form and size. That is to say, it is intended that the degree of axial pressure employed shall not be sufficient to break down and destroy the resilient or reactive quality of the conical form herein described. On the contrary, it is the purpose in practicing this invention that the degree of compression employed shall be limited to a degree where such reactive characteristic of said conical form will not be seriously affected.

For a better understanding of the operation of the sealing elements of hollow conical and frusto conical forms of this invention, it is suggested that they function like a toggle. This analogy is, of course, not absolute, but when considered in that light, it may be helpful to a clearer conception of the operation of the invention. When force is applied to the elbow of a toggle, a greater force is exerted at the ends of the toggle links, and this force increases in proportion as the axial dimensions of the toggle, relative to the distance between the ends of the links, becomes less and less.

The sealing elements of the present invention may be considered as functioning like a multiplicity of toggles; that is to say, there is a toggle-like action in each diametric plane, and, obviously, there is an infinite number of toggles. When the sealing elements are compressed axially, the dimensions of such elements and the proportioning of the obdurate material of which they are composed, bring about, within the elements, the steadily increasing functional characteristics incidental to toggle action. This action results in a cross axial or radial movement of the sealing elements until their periphery or peripheries are forced into tight sealing engagement with cooperating seats. The obdurate element, in either case, is so dimensioned and proportioned that the seal is effected, in the manner described, before the elastic limit of the element is reached. Accordingly, upon release of the stresses incident to producing the seal, the element tends to autogenously, i. e., automatically, break the seal.

In practically carrying out this invention, the obdurate sealing elements may constitute either the sealing member or the valve seat. In the former case, the obdurate part is preferably, though not necessarily, in the form of a hollow cone carried by a suitable valve stem and cooperating with a rigid seat. In the latter case, the seat partakes of hollow frusto conical configuration is supported at its outer periphery by a suitable seat ring, and its inner periphery cooperates with a rigid sealing member carried by the valve stem.

The present invention solves many problems which have long been recognized. It provides for a perfect seal by application of a minimum of force and this seal may be made and broken a great number of times without excessive wear on the sealing elements of the valve. Moreover, it is characteristic of the invention that, when the sealing stresses are relieved, the obdurate sealing element will automatically, i. e., autogenously, tend to return to its original form; that is to say, for all practical purposes, it will return to its uncompressed form, though not necessarily to absolutely the same form as it was prior to compression, for it may change slightly under compression.

Features of the invention, other than those specified, will be apparent from the hereinafter detailed description and claims, when read in conjunction with the accompanying drawing.

The accompanying drawing illustrates a practical embodiment of the invention, but the construction therein shown is to be understood as illustrative, only, and not as defining the limits of the invention.

The illustration is a cross sectional view of a valve embodying the present invention. Referring to the drawing, 1 designates a valve casing having a partition or diaphragm 2 in which is formed a port opening 3. The opening 3 is threaded to receive a complementarily threaded seat ring 4, through which there is a coaxial passage, a portion 5 of the wall of which constitutes the valve seat. This seat may be of various shapes, but is shown as longitudinally stepped at 5$^a$ to form a stop shoulder. The wall of the passage above this shoulder constitutes the rigid seat 5. It will be noted that the seat ring is provided with a radially extending flange 6 which bears upon a gasket 7 for the purpose of forming a tight joint with the diaphragm of the valve.

The valve casing is provided with a suitable bonnet 8 through which is threaded a valve stem 9, a gland 10 serving to preclude leakage. To the upper end of the valve stem is secured a suitable hand wheel 11, while at the lower end of such stem an enlargement 12 is formed. The enlargement projects into the spindle 15 of the valve and is held in place therein by means of the locking ring 16 which has threaded engagement with the spindle.

Carried by the spindle 15 and joined thereto by an intermediate neck 17 of reduced cross section is the sealing member 18 of the valve.

The sealing member 18 is of obdurate material and is of hollow conical configuration. It is of a diameter adapting it to enter the upper part of the passage in the seat ring, so that by the manipulating of the hand wheel, the sealing member may be moved from unsealing position into sealing position and vice versa. When in normal unsealing position, the sealing member is held well above the seat ring and as far as feasible out of the direct path of fluid passing through the valve. When moved into sealing position, said member is lowered into engagement with the stop shoulder 5$^a$ prior to applying to said member the compression hereinbefore referred to.

I have found, as previously stated, that if a hollow conical structure of obdurate material is brought into engagement with a resisting seat, axial pressure applied to said structure will decrease its altitude and correspondingly expand its periphery. It therefore follows that if the sealing member is lowered to bring its outer periphery into engagement with the stop shoulder 5$^a$, the application of axial force to said member will cause the periphery thereof to tightly engage said seat 5. Thus, when the valve stem is screwed down, the shoulder forms an abutment acting to preclude downward movement of the sealing element, so that when pressure is applied through the valve stem, the sealing member will be depressed axially to expand the periphery to form a tight seal with the seat 5. Being of hollow conical construction and of obdurate material, this operation will stress the sealing member and, as long as the pressure of the stem is maintained, these stresses will continue and the seal will remain tight. If, however, the stem is rotated in a retrograde direction to relieve the stresses referred to, the sealing member will, because of its obduracy, return or tend to return to its normal unsealing form, and in so doing will break the seal autogenously, i. e., of itself, as soon as the pressure of the stem is relieved.

It is of marked practical importance that the zeal is effected, while stressing the sealing member within its elastic limit, so that the tendency of the sealing member to resume or spring back towards its original form, when pressure is relieved, is substantially unimpaired from a practical standpoint.

I have found, as a result of exhaustive experimentation, that, by the employment of a hollow conical member of obdurate material, a repetitive seal is produced without requiring the usual grinding operations heretofore considered essential in the making of valves and valve seats. This result is secured by machining the sealing member and the seat as is usual in the art without the grinding heretofore deemed essential.

As shown in the drawing, a tight seal results from the coordinating action of the outer periphery of the sealing member and the surface of the seat, due to the outward spreading or expansion of the sealing element as hereinbefore described. Practice has fully demonstrated that even though the seat or the sealing member be slightly out of round, a tight seal may nevertheless be effected by the construction illustrated.

It will be noted that in both the conical and frusto conical forms, the sealing element has straight sides and this general form is conducive to the best practical results. I am aware, however, that some of the advantages of my invention may be obtained through the employment of a sealing element of obdurate material having other than straight sides, such, for example, as hollow spherical or elliptical sections, but, in practice, they are not so desirable as the straight sided forms to which reference has been particularly made. It is found in practice that the frusto conical form operates as has been described in connection with the conical form to produce a proper seal irrespective of slight irregularities of the seats of the valve or a condition wherein the seats are slightly out of round. Moreover, grinding or lapping the seats for cooperation with the frusto conical member is not necessary.

The tendency of the conical or frusto conical sealing elements of obdurate material to autogeneously return or tend to return to their original forms after compression is of primary importance. As previously stated, such retraction does not necessarily involve a return of the sealing element to exactly the same form, but to approximately that same form when considered from a practical standpoint. Such a tendency to return or spring back specifies the practical requirements of the present invention. The resilient quality of the obdurate material from which the hollow conical or frusto conical element is made lends itself to repeated action and reaction hrough an extended period of operation.

The foregoing detailed description sets forth the invention in its preferred practical forms and the invention is to be understood as fully commensurate with the appended claims.

In the claims, the expression "conical section" is to be given a sufficiently broad interpretation to include all of the forms of the invention herein referred to.

Having thus fully described the invention, what I claim as new and desire to secure by Letters Patent is:

1. In a valve a seat cylindrical in form, having a sealing face parallel with its axis and an annular shoulder within said cylinder of a less diameter than the diameter of said cylinder, in combination with a hollow conical section of obdurate metal, the external and internal walls of said hollow conical sections being parallel, said hollow conical section having a peripheral bearing surface parallel with the axis thereof, said hollow conical section mounted within said cylindrical face and normally bearing the relation of a loose fit with said cylindrical sealing face, and mounted to engage said annular shoulder within said cylinder, means to compress said hollow conical section axially to cause the same to engage said shoulder and to expand cross-axially to engage said cylindrical surface, the degree of such compression being limited within the elastic limit of said hollow conical section, and means to relieve such compression to permit said hollow conical section to react due to the inherent resiliency thereof.

2. In a valve a seat cylindrical in form, having a sealing face parallel with its axis and an annular shoulder within said cylinder of a less diameter than the diameter of the said cylinder, in combination with a hollow conical section formed of metal, having the characteristic of being bendable but not easily deformed, and also having the quality of resiliency under axial compression and relief from such compression, the external and internal walls of said hollow conical section being parallel, said hollow conical sections having a peripheral bearing surface parallel with the axis thereof, the said hollow conical sections mounted within said cylindrical face and normally bearing the relation of a loose fit with said cylindrical sealing face and mounted to engage said annular shoulder within said cylinder; means to compress said hollow conical section axially to cause the same to engage said shoulder and to expand cross axially to engage said cylindrical surface, the degree of such compression being limited within the elastic limit of said hollow conical section, and means to relieve such compression to permit said hollow conical section to react due to the inherent resiliency thereof.

3. In a valve, a seat cylindrical in form, having a sealing face parallel with its axis and an annular shoulder within said cylinder of a less diameter than the diameter of said cylinder; in combination with a hollow conical section of obdurate metal, said hollow conical section having a peripheral bearing surface parallel with the axis thereof, said hollow conical section being mounted within said cylindrical face and normally bearing the relation of a loose fit with said cylindrical sealing face, and mounted to engage said annular shoulder within said cylinder; means to compress said hollow conical section axially to cause the same to engage said shoulder and to expand cross-axially to engage said cylindrical surface, the degree of such compression being limited within the elastic limit of said hollow conical section; and means to relieve such compression to permit said hollow conical section to react due to the inherent resiliency thereof.

4. In a valve, a seat cylindrical in form, having a sealing face parallel with its axis and an annular shoulder within said cylinder of a less diameter than the diameter of the said cylinder; in combination with a hollow conical section formed of metal, having the characteristic of being bendable but not easily deformed, and also having the quality of resiliency under axial compression and relief from such compression, said hollow conical section having a peripheral bearing surface parallel with the axis thereof, the said hollow conical sections mounted within said cylindrical face and normally bearing the relation of a loose fit with said cylindrical sealing face and mounted to engage said annular shoulder within said cylinder; means to compress said hollow conical section axially to cause the same to engage said shoulder and to expand cross axially to engage said cylindrical surface, the degree of such compression being limited within the elastic limit of said hollow conical section; and means to relieve such compresson to permit said hollow conical section to react due to the inherent resiliency thereof.

Signed by me at Jersey City, N. J., this 29 day of December 1925.

WYLIE G. WILSON.